United States Patent
Crespi

(10) Patent No.: US 10,116,906 B1
(45) Date of Patent: Oct. 30, 2018

(54) ELEVATED MARINE CAMERA

(71) Applicant: Juan A. Crespi, Miami, FL (US)

(72) Inventor: Juan A. Crespi, Miami, FL (US)

( * ) Notice: Subject to any disclaimer, the term of this patent is extended or adjusted under 35 U.S.C. 154(b) by 0 days.

(21) Appl. No.: 15/671,300

(22) Filed: Aug. 8, 2017

(51) Int. Cl.
| | | |
|---|---|---|
| H04N 5/00 | (2011.01) | |
| H04N 7/18 | (2006.01) | |
| G03B 17/56 | (2006.01) | |
| B60R 11/04 | (2006.01) | |

(52) U.S. Cl.
CPC ............ *H04N 7/183* (2013.01); *B60R 11/04* (2013.01); *G03B 17/561* (2013.01); *B60R 2300/101* (2013.01)

(58) Field of Classification Search
CPC .......... G05B 1/06; A45F 5/00; F16M 11/041; F16M 11/105; F16M 11/18; F16M 11/2014; F16M 11/2021; F16M 13/04; G01C 21/18; G03B 17/561; B63B 17/02; B63B 17/00; B63B 15/00; B63H 25/02; B63H 2025/022
See application file for complete search history.

(56) References Cited

U.S. PATENT DOCUMENTS

| | | | | |
|---|---|---|---|---|
| 4,694,773 A | * | 9/1987 | Sparkes | ............... H01Q 1/34 |
| | | | | 114/354 |
| 6,988,461 B1 | * | 1/2006 | James | ............... B63B 15/00 |
| | | | | 114/364 |
| 8,281,732 B1 | | 10/2012 | Irvine | |
| 2010/0079101 A1 | * | 4/2010 | Sidman | ............... F16M 11/041 |
| | | | | 318/649 |
| 2016/0052603 A1 | * | 2/2016 | Frabetti | ............... B63B 17/02 |
| | | | | 114/361 |
| 2017/0300056 A1 | * | 10/2017 | Johnson | ............... G05D 1/0206 |

* cited by examiner

*Primary Examiner* — Frank F Huang
(74) *Attorney, Agent, or Firm* — John B. Edel; Edel Patents LLC

(57) ABSTRACT

Camera systems are disclosed relating to nautical vessels that include a linear actuator, a camera, a display, and a set of camera controls. The linear actuator may be configured to extend above the canopy such that the linear actuator fully supports the weight of the camera and such that the linear actuator is concealed within the canopy structural support. Such configurations may provide for elevated camera vantage points.

10 Claims, 4 Drawing Sheets

ELEVATED MARINE CAMERA

Marine camera systems described herein may be used in boating operation and may have particular utility for fishermen. Such systems may be useful in monitoring the surroundings of a nautical vessel and may have particular utility when an elevated vantage point is desirable.

DETAILED DESCRIPTION

Example 1

Figure 1:
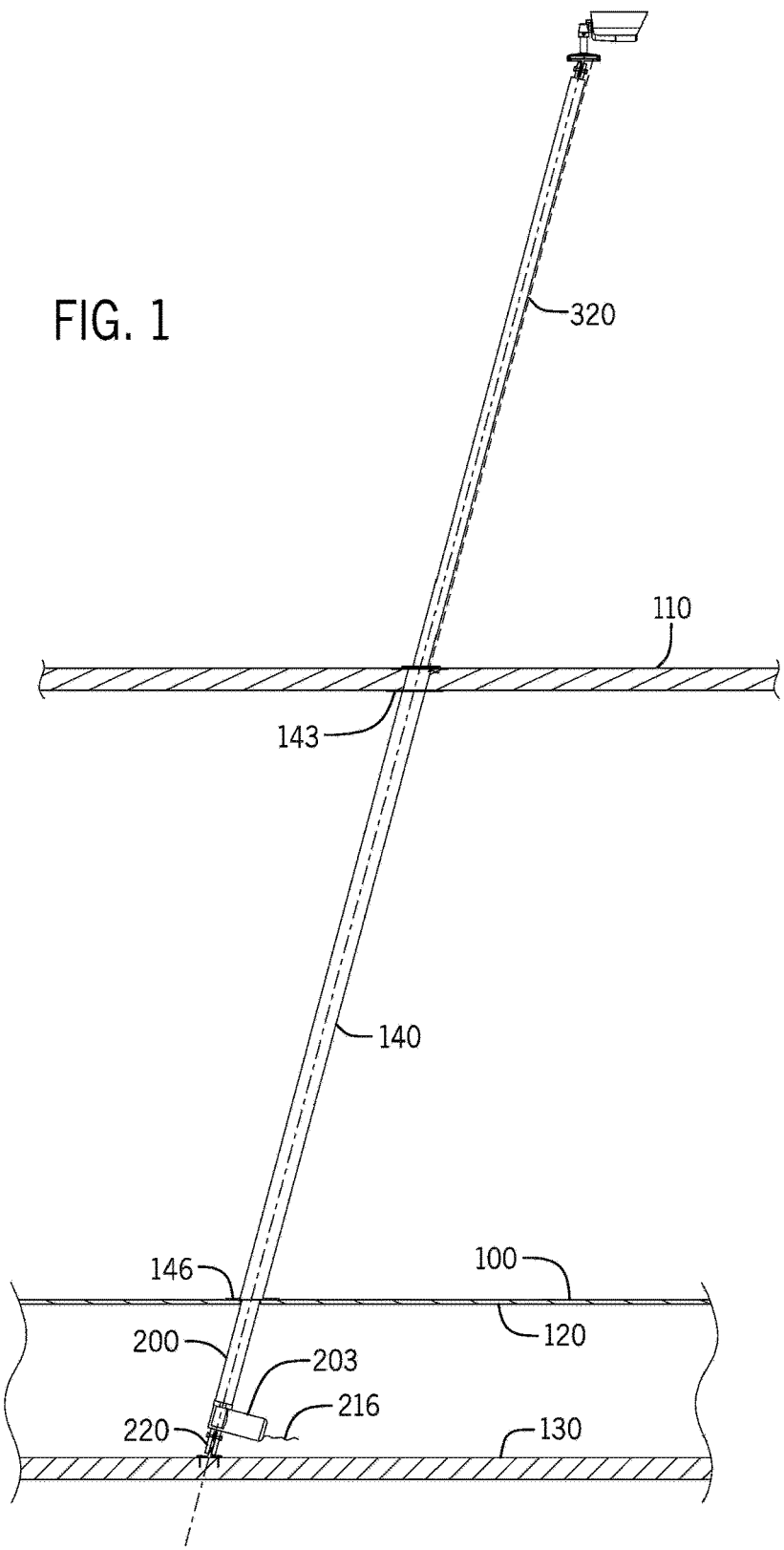
FIG. 1 shows an elevation view of a camera system with the actuator extended.
Figure 2:
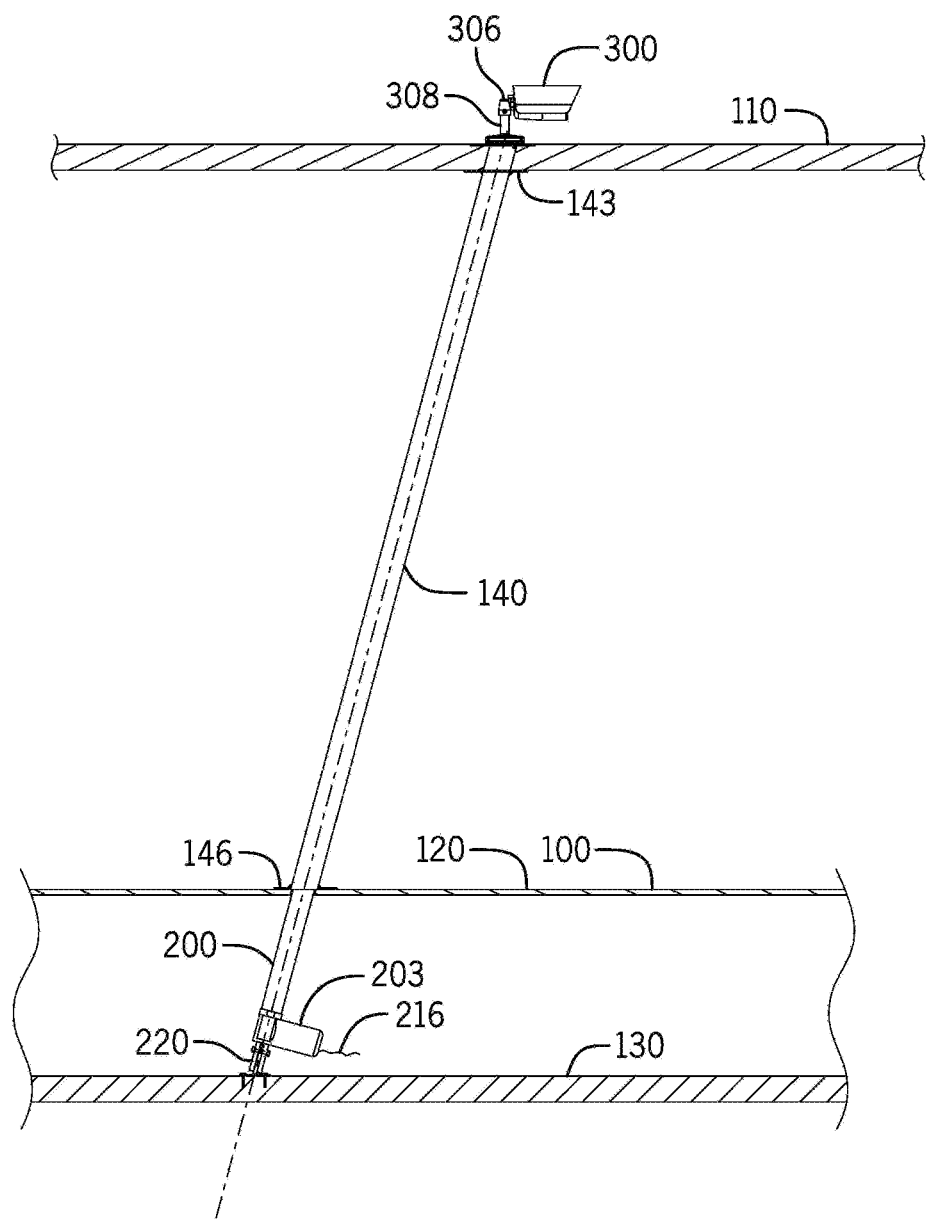
FIG. 2 shows an elevation view of a camera system with the actuator retracted.
Figure 3:
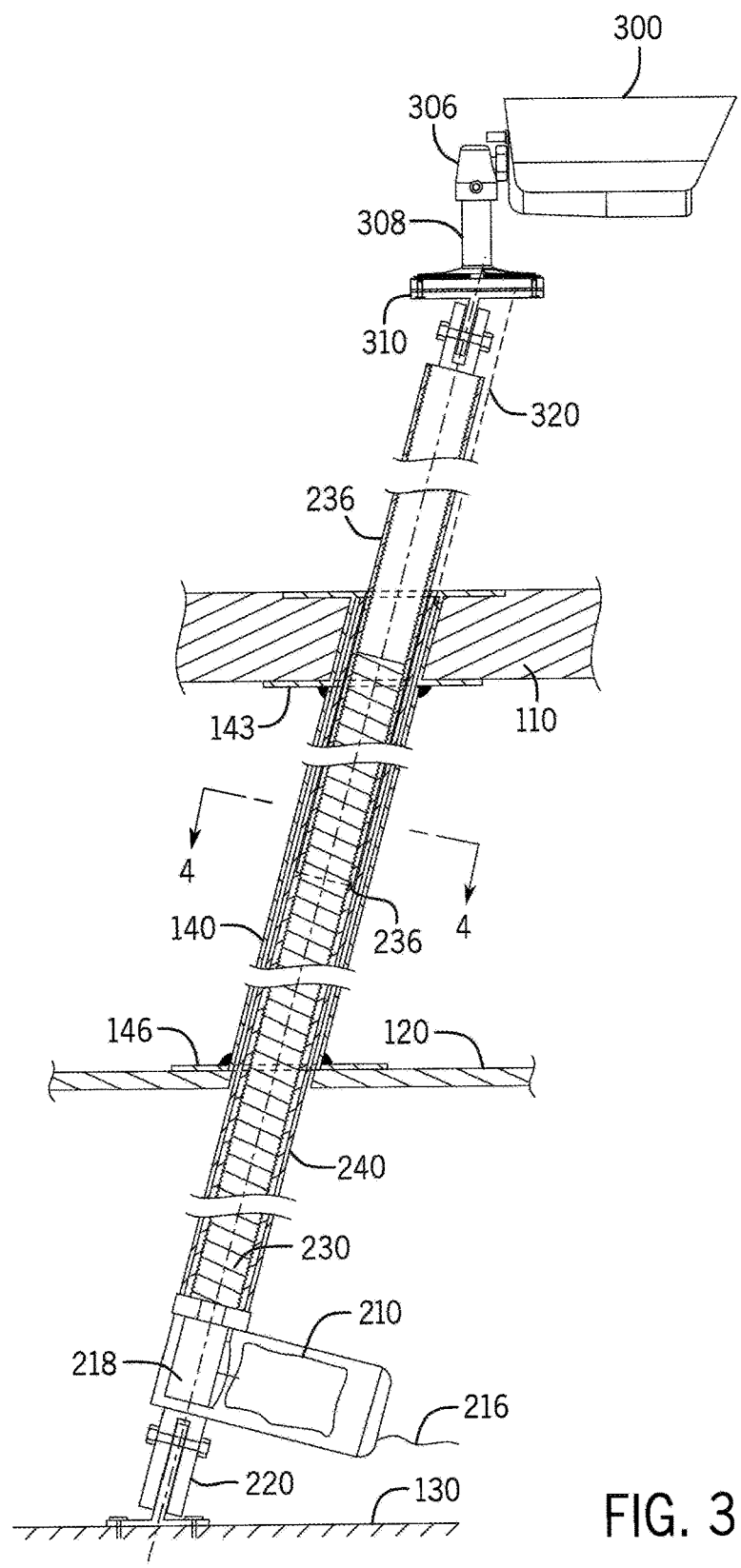
FIG. 3 shows an elevation view of a camera system with the actuator extended.
Figure 4:
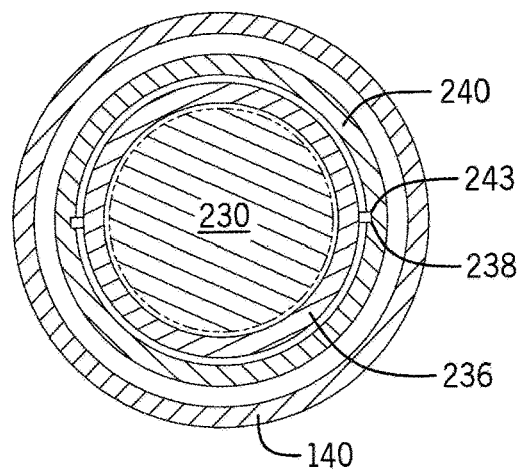
FIG. 4 shows a cross section of the actuator and support pole.
Figure 5:
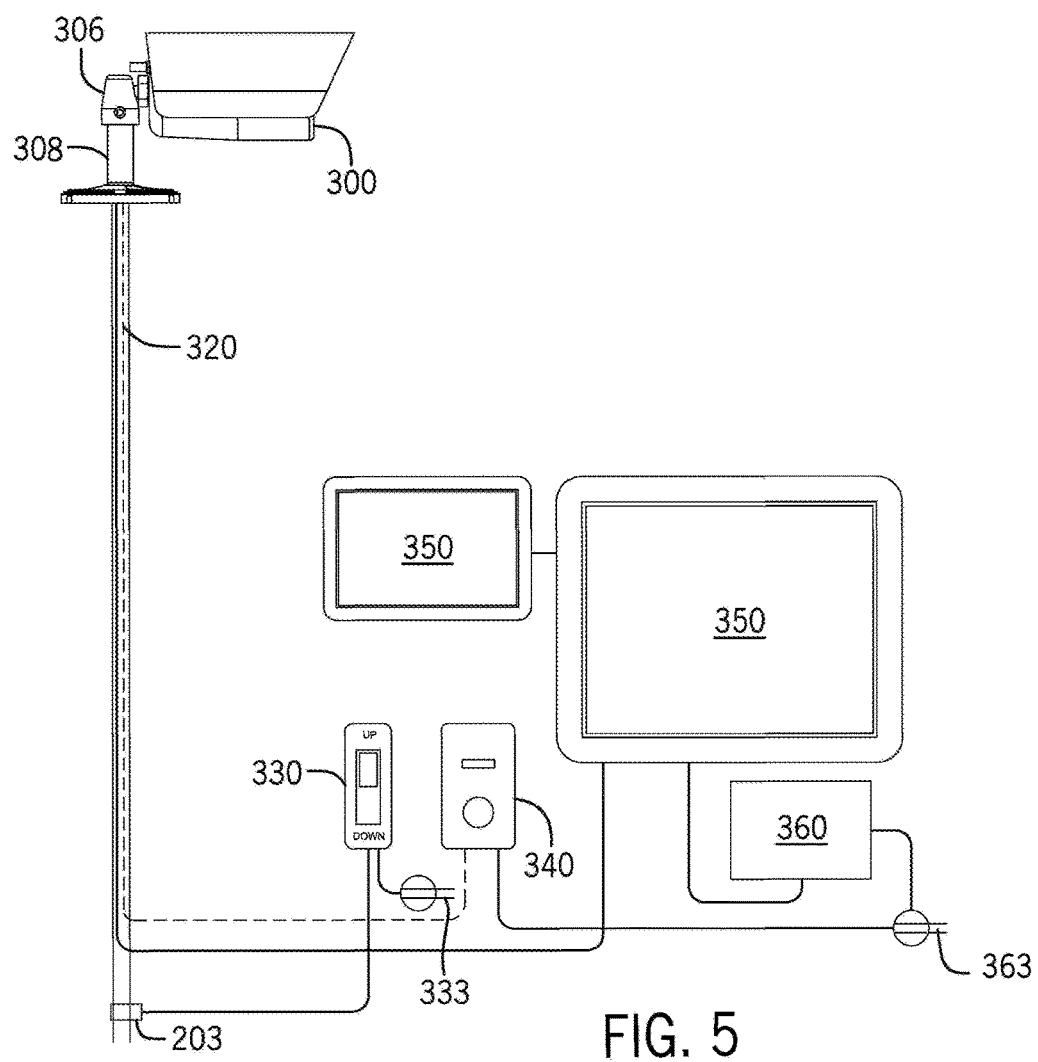
FIG. 5 shows a diagram of the control system for the camera.

Referring now to FIGS. 1-5 of the drawings Boat 100, Boat hardtop 110, Boat fiberglass deck 120, Boat fiberglass hull 130, Hardtop support pole 140, Hardtop support pole upper flange 143, Hardtop support pole lower flange 146, Actuator 200, Actuator motor housing 203, Actuator motor 210, Actuator power cord 216, Actuator gears 218, Actuator hull attachment 220, Actuator drive shaft 230, Outer shaft 236, Shaft guides 238, Actuator outer tube 240, Shaft guide slots 243, Camera 300, Camera pivot 306, Camera support 308, Camera mount plate 310, Camera wiring harness 320, Actuator control switch 330, Actuator control power supply 333, Camera control joystick 340, Monitors 350, Marine network equipment 360 and Equipment power supply 363 are shown.

Marine camera systems may take the form depicted in FIGS. 1-5. In such embodiments Boat 100 may include Boat hardtop 110, Boat fiberglass deck 120, Boat fiberglass hull 130, Hardtop support pole 140, Hardtop support pole upper flange 143 and Hardtop support pole lower flange 146. Those components may be components of Boat 100 prior to and installation of the Marine camera system or the Marine camera system may be installed as an integral part of Boat 100 as it is manufactured. Actuator 200 acts to raise and lower Camera 300 allowing a user to have an elevated view of the surroundings of the boat. Actuator 200 is a linear actuator. Actuator 200 may have an Actuator motor housing 203 containing an Actuator motor 210 and Actuator gears 218 that operate to rotate Actuator drive shaft 230 within Actuator outer tube 240. Actuator drive shaft 230 has external threading in contact with the internal threading of Actuator outer tube 240 allowing for the rotation of Actuator drive shaft 230 to raise and lower both Actuator outer tube 240 and Camera 300. Actuator power cord 216 provides the power necessary to operate Actuator 200. Actuator hull attachment 220 may be installed to fix Actuator 200 in appropriate alignment such that Actuator 200 is aligned within Hardtop support pole 140. Outer shaft 236 may have Shaft guides 238 fixed on opposite sides of Outer shaft 236 which act to prevent the rotation of Outer shaft 236. Shaft guide slots 243 on Actuator outer tube 240 allow Outer shaft 236 to slide vertically within Actuator outer tube 240. Camera 300 may for example be capable of pivoting around Camera pivot 306 allowing for 360° rotation and viewing around the Boat 100. Camera support 308 holds Camera 300 in place and may be fastened to Camera mount plate 310. Camera wiring harness 320 connects Camera 300 to camera operation equipment typically located at the helm. Actuator control switch 330 is wired to Actuator 200 and may be used as the control to raise and lower Camera 300 with Actuator 200. Actuator control power supply 333 supplies the power to Actuator control switch 330. Camera control joystick 340 may be used to direct and position Camera 300 for viewing the surroundings of Boat 100. Monitors 350 display the input from Camera 300 among other inputs from Marine network equipment 360. Equipment power supply 363 supplies power to Marine network equipment 360 and Camera control joystick 340.

Actuator 200 may be powered by a 12V DC motor and may be fabricated from components having sufficient length and other dimensions to match the applications described herein. Although commercial linear actuators having the lengths of certain examples described herein may not be commercially available, linear actuators produced by Firgelli Automations of 1465 Slater Road, Ferndale, Wash. 98248 such as Heavy Duty Rod Actuator—IP66 Rated—Model FA-200-IP66-12-XX are consistent with the type of linear actuator contemplated by the present disclosure.

The total extended actuator length may, for example, be 156 inches with certain examples falling between 96 and 280 inches and a significant number of those examples falling between 126 and 218 inches.

The total retracted actuator length may, for example, be 85 inches with certain examples falling between 42 and 153 inches and a significant number of those examples falling between 64 and 119 inches.

The hardtop support pole outer diameter may, for example, be 2.5 inches with certain examples falling between 1.6 and 4.1 inches and a significant number of those examples falling between 1.9 and 3.1 inches. In a related example the hardtop support pole outer diameter may be 2.0 inches.

The actuator outer tube outer diameter may, for example, be 2.0 inches with certain examples falling between 0.9 and 3.1 inches and a significant number of those examples falling between 1.4 and 2.6 inches.

The actuator outer shaft length may, for example, be 84.0 inches with certain examples falling between 50.0 and 152.0 inches and a significant number of those examples falling between 67.0 and 118.0 inches.

The actuator outer shaft outer diameter may, for example, be 1.625 inches with certain examples falling between 0.98 and 3.1 inches and a significant number of those examples falling between 1.3 and 2.3 inches.

The camera system may be part of the GPS Network of the nautical vessel and may be one of many commercially available camera systems designed for use in nautical vessels. The camera system may be configured to be a component of a boats network. As an example, a CAM100 Marine Camera with day and night video camera along with a model number E32130, joystick control unit for thermal cameras and a E70232-NAG-a95 9" multifunction display each sold by Raymarine Inc. of 9 Townsend West Nashua, N.H. 03063 may be used as the components of the system. Comparable systems such as those sold by Garmin, Furuno and Lowrance may also be used.

In an alternate embodiment, a hydraulic lifting system may be used as the linear actuator.

Embodiments described herein may be installed on boats having lengths of 45 feet or less and may be matched to boats that do not have towers. The embodiments described herein may have particular utility in boats that do not have tuna towers. The camera system may allow for a single fisherman to fish for tuna or other fish. In particular, the camera system may allow a single individual to navigate based on an elevated view of the surroundings, pilot the boat, and fish. Essentially the captain of the boat may be able to serve as a lookout and a fisherman at the same time. Doing so may avoid unnecessary trips up and down a ladder and may avoid injury caused by such climbing. Further, the camera may be equipped with a zoom feature to eliminate the need for binoculars. Still further, the camera may also be equipped with infrared capabilities.

Positioning of the actuator motor below deck may protect the motor from water damage and other environmental exposure and may further keep the equipment profile on the deck to a minimum. In many cases, excluding the flanges, the actuator system enclosed in the support structure would fit inside of a cross sectional area of three inches. Such a configuration would allow a user to benefit from the camera system without sacrificing deck space.

The actuator may be installed by removing the flange from the canopy support pole and installing the actuator motor below deck with the actuator extending through the deck then installing the canopy support pole over the actuator.

Many boats will have canopy support systems that do not easily accommodate and actuator inside the support systems. In such cases, the support systems would need to be modified into a configuration that allowed for the incorporation of a linear actuator.

In certain other circumstances, the actuator may be outside of any canopy support. For example the camera may be on a linear actuator which is situated entirely on the top of a hard-top canopy.

The camera may run off an accessory cable that includes both power and control wiring. The accessory cable may have a recoil feature enabling it to match the height of the camera at all times, recoiling as needed.

Rotation of the camera may be handled by joystick control or other similar control. Such control schemes may utilize the various control schemes and set ups provided by the various camera manufacturers.

Camera systems described herein may, for example, comprise a nautical vessel having a deck, a canopy and a canopy structural support; a linear actuator; a camera; a display and a set of camera controls such that the linear actuator fully supports the weight of the camera; the linear actuator is configured to extend above the canopy; the camera is configured to be in communication with the display; the set of camera controls is located below the canopy; the camera is located above the canopy and the linear actuator is concealed within the canopy structural support. In a related example, the canopy may be a hard-top canopy. In a related example, the linear actuator may have a motor. In a related example, the linear actuator may have an electric motor. In a related example, the linear actuator may be attached to a hull of the nautical vessel. In a related example, the linear actuator may protrude through the canopy. In a related example, the linear actuator may be configured to extend at least five feet above the canopy. In a related example, the linear actuator may be concealed within the canopy structural support in an area between the canopy and the deck. In a related example, the canopy structural support may be a pole. In a further related example, the linear actuator may have an internally threaded hollow shaft having an outer diameter between 0.98 and 3.1 inches and a length between 50.0 and 152.0 inches. In a further related example, the camera may be configured for 360° rotation. In a still further related example, the linear actuator may is located below the deck; the canopy is a hard-top canopy; the linear actuator comprises an electric motor; the linear actuator is attached to a hull of the nautical vessel; the linear actuator protrudes through the canopy; the linear actuator is configured to extend at least five feet above the canopy; the linear actuator is concealed within the canopy structural support in an area between the canopy and the deck; the canopy structural support is a pole; the linear actuator comprises an internally threaded hollow shaft having an outer diameter between 0.98 and 3.1 inches and a length between 50.0 and 152.0 inches; the camera is configured for 360° rotation and the linear actuator is located below the deck.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

I claim:

1. A camera system comprising:
   a. a nautical vessel comprising:
      i. a deck,
      ii. a canopy and
      iii. a canopy structural support;
   b. a linear actuator;
   c. a camera;
   d. a display and
   e. a set of camera controls;
   f. wherein the linear actuator fully supports the weight of the camera;
   g. wherein the linear actuator is configured to extend above the canopy;
   h. wherein the camera is configured to be in communication with the display;
   i. wherein the set of camera controls is located below the canopy;
   j. wherein the camera is located above the canopy;
   k. wherein the linear actuator is concealed within the canopy structural support;
   l. wherein the linear actuator comprises a threaded tubular shaft;
   m. wherein the threaded tubular shaft has a range of motion;
   n. wherein the threaded tubular shaft has a length between 67 and 108 inches;
   o. wherein the threaded tubular shaft is internally threaded along an entirety of the length;
   p. wherein the range of motion crosses into a space below the deck;
   q. wherein the range of motion crosses into a space above the canopy;
   r. wherein the linear actuator comprises a motor;
   s. wherein the motor is located in the space below the deck and
   t. wherein the nautical vessel has a nautical vessel length of 45 feet or less.

2. The camera system of claim 1 wherein the canopy is a hard-top canopy.

3. The camera system of claim 1 wherein the motor is an electric motor.

4. The camera system of claim 1 wherein the linear actuator is attached to a hull of the nautical vessel.

5. The camera system of claim 1 wherein the linear actuator protrudes through the canopy.

6. The camera system of claim 1 wherein the linear actuator is configured to extend at least five feet above the canopy.

7. The camera system of claim 1 wherein the linear actuator is concealed within the canopy structural support in an area between the canopy and the deck.

8. The camera system of claim 1 wherein the canopy structural support is a pole.

9. The camera system of claim 1 wherein the camera is configured for 360° rotation.

10. The camera system of claim 1 wherein:
   a. the canopy is a hard-top canopy;
   b. the motor is an electric motor;
   c. the linear actuator is attached to a hull of the nautical vessel;
   d. the linear actuator protrudes through the canopy;
   e. the linear actuator is configured to extend at least five feet above the canopy;
   f. the linear actuator is concealed within the canopy structural support in an area between the canopy and the deck;
   g. the canopy structural support is a pole and
   h. the camera is configured for 360° rotation.

\* \* \* \* \*